US012025051B1

United States Patent
Asame et al.

(10) Patent No.: US 12,025,051 B1
(45) Date of Patent: Jul. 2, 2024

(54) BELT COVER STRUCTURE FOR INTERNAL COMBUSTION ENGINE

(71) Applicant: HONDA MOTOR CO., LTD., Tokyo (JP)

(72) Inventors: Koichiro Asame, Tokyo (JP); Osamu Yoda, Tokyo (JP); Tadashi Kanamori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/556,972

(22) PCT Filed: Apr. 25, 2022

(86) PCT No.: PCT/JP2022/018706
§ 371 (c)(1),
(2) Date: Oct. 24, 2023

(87) PCT Pub. No.: WO2022/230802
PCT Pub. Date: Nov. 3, 2022

(30) Foreign Application Priority Data

Apr. 30, 2021 (JP) ................................. 2021-078040

(51) Int. Cl.
*F02B 67/06* (2006.01)
(52) U.S. Cl.
CPC .......... *F02B 67/06* (2013.01); *F02B 2275/06* (2013.01)
(58) Field of Classification Search
CPC .......... F02B 67/06; F02B 75/22; F02B 77/00; F02B 77/08; F02B 2275/06; F02F 7/00;
(Continued)

(56) References Cited

U.S. PATENT DOCUMENTS

| | | | |
|---|---|---|---|
| 5,191,859 A | 3/1993 | Fujiwara | |
| 2005/0005893 A1* | 1/2005 | Ito | F01L 1/024 123/195 A |

FOREIGN PATENT DOCUMENTS

| | | | | |
|---|---|---|---|---|
| DE | 102022003793 A1 * | 5/2023 | ............. | F01M 11/00 |
| JP | 1987-119454 U1 | 7/1987 | | |

(Continued)

OTHER PUBLICATIONS

WO2022230802A1, International Preliminary report on Patentability of PCT/JP2022/018706, obtained from https://worldwide.espacenet.com/, p. 4.*

(Continued)

*Primary Examiner* — Grant Moubry
(74) *Attorney, Agent, or Firm* — Carter, DeLuca & Farrell LLP (57) ABSTRACT

A belt cover for an internal combustion engine is provided, and the belt cover efficiently discharges water from a drain hole and has good sealing performance. A water pump 30, which is disposed on one side surface of a cylinder block CB, and which includes a drain hole 35, an oil pump case OP, which covers the inside of a timing belt TB, and a lower cover 9, which covers the outside of the timing belt TB are included. The oil pump case OP and the lower cover 9 are fixed with each other through a seal member 40, and constitute a lower case 90. A guide rib 91 and a discharge port 92 are formed inside the lower case 90, the guide rib 91 being for guiding drained water from the drain hole 35, while separating from the timing belt TB, the discharge port 92 being for discharging the drained water from the lower case 90 at a bottom end of the lower case 90, and the drained water from the drain hole 35 is guided by the guide rib 91 toward the discharge port 92.

6 Claims, 8 Drawing Sheets

(58) Field of Classification Search
CPC ... F02F 11/00; F02F 2007/0078; F16M 1/026
See application file for complete search history.

(56) References Cited

FOREIGN PATENT DOCUMENTS

| | | | |
|---|---|---|---|
| JP | 1989-022823 U1 | | 2/1989 |
| JP | H02-31539 U | | 2/1990 |
| JP | 1991-042021 U1 | | 4/1991 |
| JP | H04-269324 A | | 9/1992 |
| JP | H06101472 A | * | 4/1994 |
| JP | H09-42588 A | | 2/1997 |
| JP | 2529170 U | | 3/1997 |
| JP | H09250355 A | * | 9/1997 |
| WO | WO-2022230801 A1 | * | 11/2022 |

OTHER PUBLICATIONS

International Search Report issued in corresponding International Application No. PCT/JP2022/018706, dated Jul. 19, 2022, pp. 1-2, English Translation.

* cited by examiner

BELT COVER STRUCTURE FOR INTERNAL COMBUSTION ENGINE

CROSS-REFERENCE TO RELATED APPLICATION (S)

This is a national stage application filed under 37 U.S.C. 371 based on International Patent Application No. PCT/JP2022/018706, filed Apr. 25, 2022, which claims priority to Japanese Patent Application No. 2021-078040 filed Apr. 30, 2021, the disclosures of which are incorporated herein by reference in their entireties.

TECHNICAL FIELD

The present invention relates to a belt cover structure of an internal combustion engine for protecting a timing belt attached to the internal combustion engine.

BACKGROUND ART

In an internal combustion engine mounted on a vehicle, a timing belt (or a transmission band such as a timing chain) is used to transmit rotation power of a crankshaft in conjunction with a camshaft. Here, in order to protect the timing belt from water and dust, a belt cover for covering the timing belt is disposed in a cylinder block of the internal combustion engine. In general, the belt cover is demanded to have sealing performance for waterproof and dustproof.

In Patent Literature 1, a drainage structure bent in a labyrinth shape is provided in a lower part of a timing belt cover and a lower part of an engine body, and water accumulated in the timing belt cover is discharged. However, if water is accumulated in the timing belt cover, the water will drop onto the timing belt, and may degrade the timing belt.

In Patent Literature 2, a guide inclined from a drain hole of a water pump disposed inside a timing belt cover toward an internal combustion engine body side is provided. The water discharged from the drain hole is once guided to the internal combustion engine body side along such a guide, and is then guided below a crank pulley. This prevents the water from dropping onto the timing belt.

CITATION LIST

Patent Literature

Patent Literature 1: JP 2529170 U
Patent Literature 2: JP H02-31539 U

SUMMARY OF INVENTION

Technical Problem

In Patent Literature 1, however, in order to improve drainage performance so that water is not accumulated inside the cover, it is necessary to provide a large discharge port. For this reason, a complicated labyrinth structure has to be provided to suppress entry of foreign matters. Hence, it is difficult to achieve both the drainage performance and the suppression of entry of foreign matters. In configuring the guide inclined toward the internal combustion engine body side as in Patent Literature 2, a recessed portion for arranging the guide has to be formed on the internal combustion engine body side, Hence, there is a restriction on the layout of the surface of the internal combustion engine body. For this reason, in a case where it is impossible to form the recessed portion, such a configuration is not adoptable.

In addition, for maintenance of the water pump disposed inside the timing belt cover, it is also conceivable that an opening is formed in the timing belt cover in the vicinity of the drain hole of the water pump. However, water or foreign matters may enter from the opening. As described above, efficient discharge of water in the drain hole and sealing performance for the waterproof and dustproof are demanded for a belt cover, without a recessed portion formed for draining the water in the internal combustion engine body.

The present invention has been made to address the above issues, and has an object to provide a belt cover of an internal combustion engine that efficiently discharges water in a drain hole and that has good sealing performance.

Solution to Problem

In order to achieve such an object, the invention according to claim 1 is a belt cover structure for an internal combustion engine, and the belt cover structure for the internal combustion engine 1 being configured to accommodate at least a part of a timing belt TB disposed on one side surface of an internal combustion engine body (cylinder block CB in an embodiment (hereinafter, the same will apply in the present paragraph)), the belt cover structure including: a water pump 30 disposed on the one side surface, and including a drain hole 35 for draining water; an inner cover member (oil pump case OP) that covers the timing belt TB on a side closer to the internal combustion engine 1 than the timing belt TB; and an outer cover member (lower cover 9) that covers the timing belt TB on a side farther from the internal combustion engine 1 than the timing belt TB, in which the inner cover member and the outer cover member are fixed with each other through a seal member 40 to constitute a case (lower case 90), a guide rib 91 and a discharge port 92 are formed inside the case, the guide rib 91 being for guiding drained water from the drain hole 35 to a lower side of the case, while separating the drained water from the drain hole from the timing belt TB, the discharge port 92 being for discharging the drained water from the case, and the drained water from the drain hole 35 is guided by the guide rib 91 toward the discharge port 92.

In this manner, the drained water from the drain hole of the water pump is guided by the guide rib formed inside the case toward the discharge port. The drained water from the drain hole is intentionally guided to the inside of the case, is guided to the lower side of the case, and is then discharged. This eliminates the need for providing an opening for the drained water in the vicinity of the drain hole. In addition, since the inner cover member and the outer cover member are fixed with each other through the seal member, the sealing performance is good. This enables provision of a belt cover for the internal combustion engine such that the water in the drain hole is efficiently discharged, water and dust are prevented from entering from near the drain hole, and sealing performance for the waterproof and dustproof is good.

The invention according to claim 2 is the belt cover structure for the internal combustion engine described in claim 1, in which an inclined wall 93a inclined toward the discharge port 92 is formed in a lower part on an inner wall 93 of the case, a bottom end 91a of the guide rib 91 is formed toward the inclined wall 93a, and the drained water from the drain hole 35 is guided via the guide rib 91 and the inclined wall 93a to the discharge port 92.

In this manner, by forming the bottom end of the guide rib toward the inner wall of the case, the drained water can be guided in a direction away from the timing belt. In addition, the inclination of the inclined wall enables the drained water to be efficiently guided to the discharge port.

The invention according to claim 3 is the belt cover structure for the internal combustion engine described in claim 1 or 2, in which the inner cover member is assembled to the internal combustion engine body to be adjacent to a lower side of the water pump 30, an inclined surface 89 is formed between the inner cover member and the internal combustion engine body, and the drained water from the drain hole 35 is guided along the inclined surface 89 to an inside of the case.

In this manner, in the case where the inner cover member is assembled with the internal combustion engine body to be adjacent to the lower side of the water pump, the drained water from the drain hole of the water pump is configured to be guided to the inside of the case along the inclined surface formed between the inner cover member and the internal combustion engine body, so that the drained water from the drain hole of the water pump can be smoothly guided to the inside of the case.

The invention according to claim 4 is the belt cover structure for the internal combustion engine described in claim 3, in which on the outer cover member, a protrusion portion 94a protruding in a direction of the internal combustion engine body beyond the inner cover member is formed in a position facing the inclined surface 89, the protrusion portion 94a being fixed to the internal combustion engine body through the seal member 40, and the inclined surface 89 is separated from an outside of the case by the protrusion portion 94a.

In this manner, the protrusion portion of the outer cover member is fixed to the internal combustion engine body through the seal member beyond the inner cover member, so that the inclined surface to which the protrusion portion guides the drained water can be separated from the outside of the case. This enables enhancement in waterproof and dustproof effects of the case.

The invention according to claim 5 is the belt cover structure for the internal combustion engine described in one of claims 1 to 4, in which the case 90 accommodates a drive pulley 15 attached to a crankshaft 10, an inclined wall 93a inclined toward the discharge port 92 is formed in a lower part of the case 90, the guide rib 91 is formed on the inner cover member, on the inner cover member, a vibration suppression rib (rib 95a) extending in a radial direction of the drive pulley 15 to suppress vibration of the inner cover member is formed on a lower side than the bottom end of the guide rib 91, and after the drained water from the drain hole 35 is guided to the guide rib 91, the drained water is guided to the inclined wall 93a via the vibration suppression rib.

In this manner, the vibration suppression rib formed to suppress the vibration of the inner cover member extends in the radial direction of the drive pulley attached to the crankshaft, and is formed below a bottom end of the guide rib, so that after the drained water is guided to the guide rib, the drained water is guided toward the inclined wall via the vibration suppression rib. This further enables the drained water to be guided in a direction away from the timing belt, and it becomes possible to suppress the drained water from dropping onto the timing belt.

The invention according to claim 6 is the belt cover structure for the internal combustion engine described in one of claims 1 to 5, in which the inner cover member is a part of an oil pump case OP that accommodates an oil pump.

In this manner, in the case where the inner cover member is made to be a part of the oil pump case, the inner cover member can also have a function of accommodating the oil pump, and the inner cover member can be effectively used.

DESCRIPTION OF EMBODIMENTS

Hereinafter, preferred embodiments of a belt cover structure of an internal combustion engine 1 in the present invention will be described in detail with reference to the drawings. It is to be noted that in the present embodiment, a case where the internal combustion engine 1 is vertically installed will be described as an example. In addition, a description will be given assuming that a direction in which a crankshaft 10 and camshafts 11, 12, 13, and 14 of the internal combustion engine 1 extend denotes an axial direction, a vertically upward direction and a vertically downward direction each denote an up-down direction, and a front-rear direction of a vehicle in a case where the internal combustion engine 1 is vertically placed on the vehicle denotes a front-rear direction.

Figure 1:
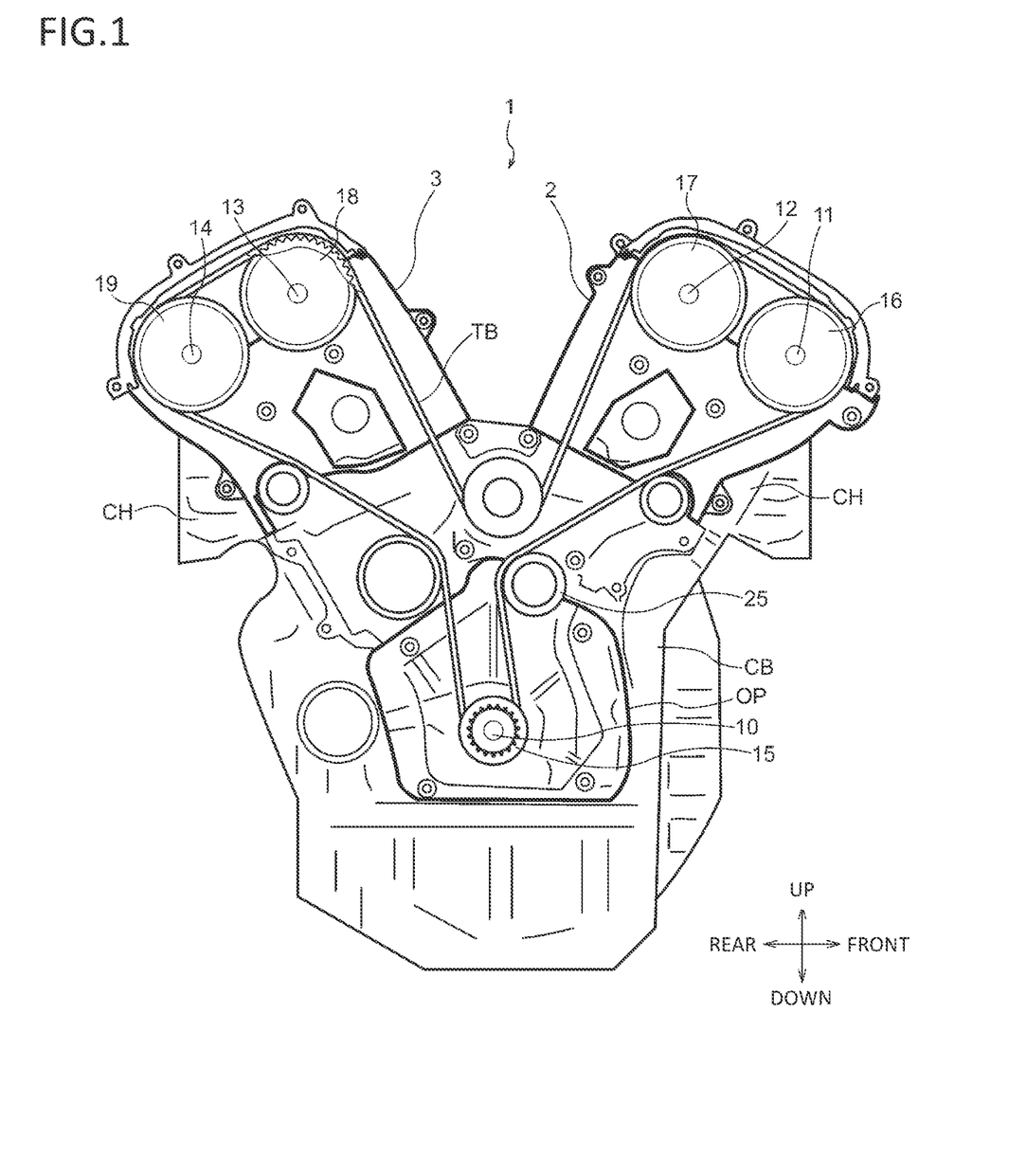
FIG. 1 is a diagram illustrating a timing belt and a belt cover disposed inside the timing belt, in an internal combustion engine.
Figure 2:
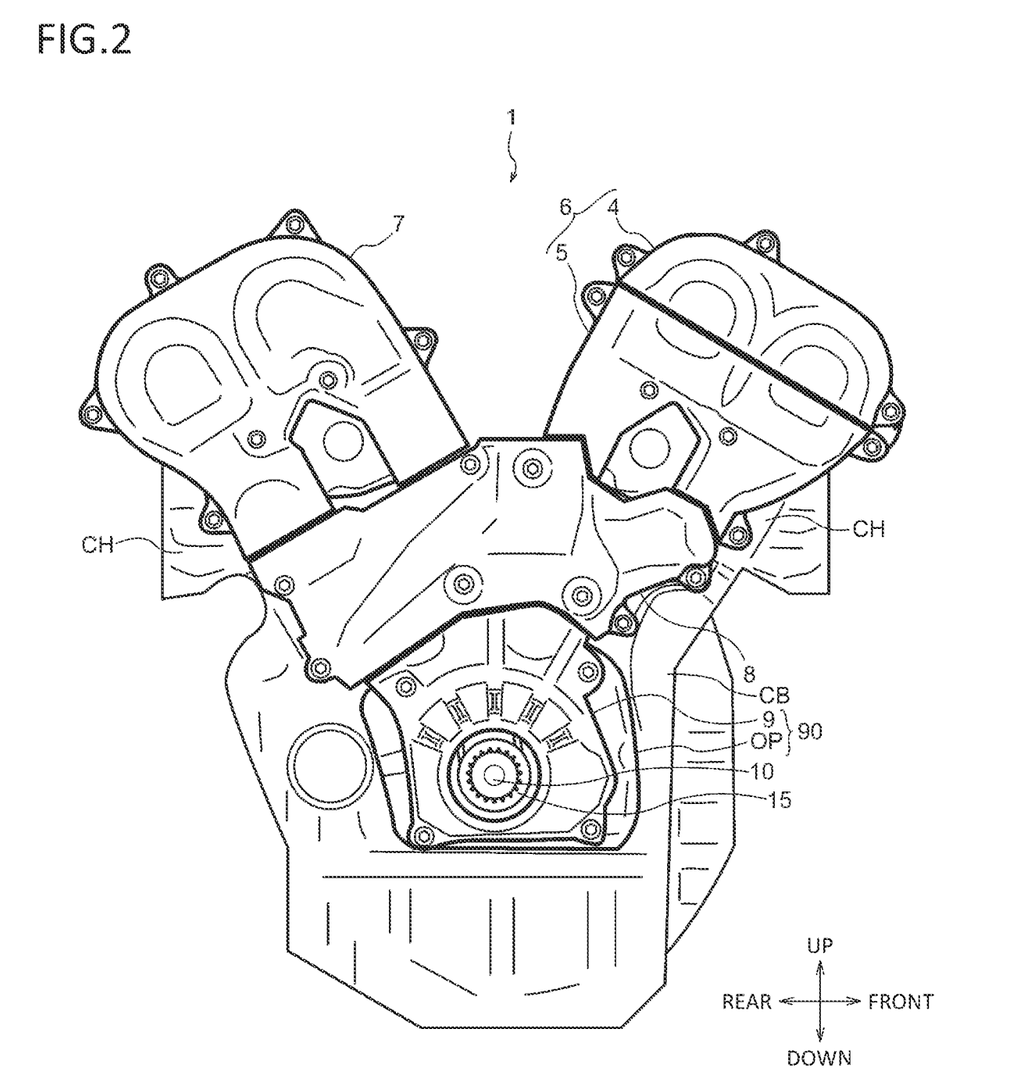
FIG. 2 is a diagram illustrating a belt cover disposed outside the timing belt, in the internal combustion engine.

An outline of a structure of a timing belt TB of the internal combustion engine 1 and a belt cover structure of the internal combustion engine 1 will be described with reference to FIGS. 1 and 2. FIG. 1 is a diagram illustrating the timing belt TB and a belt cover disposed inside the timing belt TB, in the internal combustion engine 1. FIG. 2 is a diagram illustrating the belt cover disposed outside the timing belt TB, in the internal combustion engine 1. It is to be noted that with regard to inside and outside mentioned here, inside denotes a side close to cylinder heads CH, CH or a cylinder block CB of the internal combustion engine 1 with respect to the timing belt TB, and outside denotes its opposite side.

As illustrated in FIG. 1, a crankshaft 10 and camshafts 11, 12, 13, and 14 are each disposed in a protruding manner in the cylinder heads CH, CH and the cylinder block CB on one side surface of the internal combustion engine 1. The crankshaft 10 and the camshafts 11, 12, 13, and 14 are respectively coupled with drive pulleys 15, 16, 17, 18, and 19. The timing belt TB is stretched over the drive pulleys 15, 16, 17, 18, and 19 and other pulleys. This causes the crankshaft 10 and the camshafts 11, 12, 13, and 14 to rotate in conjunction with one another.

As illustrated in FIGS. 1 and 2, the timing belt TB is protected by a belt cover. The belt cover is assembled to one side surface of the internal combustion engine body. The belt cover in the present embodiment includes a front inner cover 2, a rear inner cover 3, an upper outer cover 4, a lower outer cover 5, a rear outer cover 7, a side mount bracket 8, and a lower cover 9. Spaces between the respective covers are sealed with arrangements of seal members or the like, and the belt cover accommodates the timing belt TB in a liquid-tight state as a whole.

An assembling procedure of the belt cover in the present embodiment will be described with reference to FIGS. 1 and 2. First, as a precondition, as illustrated in FIG. 1, before the timing belt TB is assembled to the internal combustion engine 1, the front inner cover 2 and the rear inner cover 3 are assembled to the cylinder heads CH, CH. In addition, an oil pump case OP is assembled to the cylinder block CB.

As illustrated in FIG. 2, the lower cover 9 is attached around the crankshaft 10, and the side mount bracket 8 is attached to be adjacent to an upper side of the lower cover 9. Then, the rear outer cover 7 covers the outside of the drive pulleys 18 and 19 of the camshafts 13 and 14, and is attached to be adjacent to an upper side of the side mount bracket 8. In addition, the lower outer cover 5 is attached to be adjacent to an upper side of the side mount bracket 8, and the upper outer cover 4 is attached to be adjacent to an upper side of the lower outer cover 5. Here, the upper outer cover 4 and the lower outer cover 5 integrally constitute a front outer cover 6 for covering the outside of the drive pulleys 16 and 17 of the camshafts 11 and 12. The front outer cover 6 is disposed on a front side relative to the rear outer cover 7.

Figure 3:
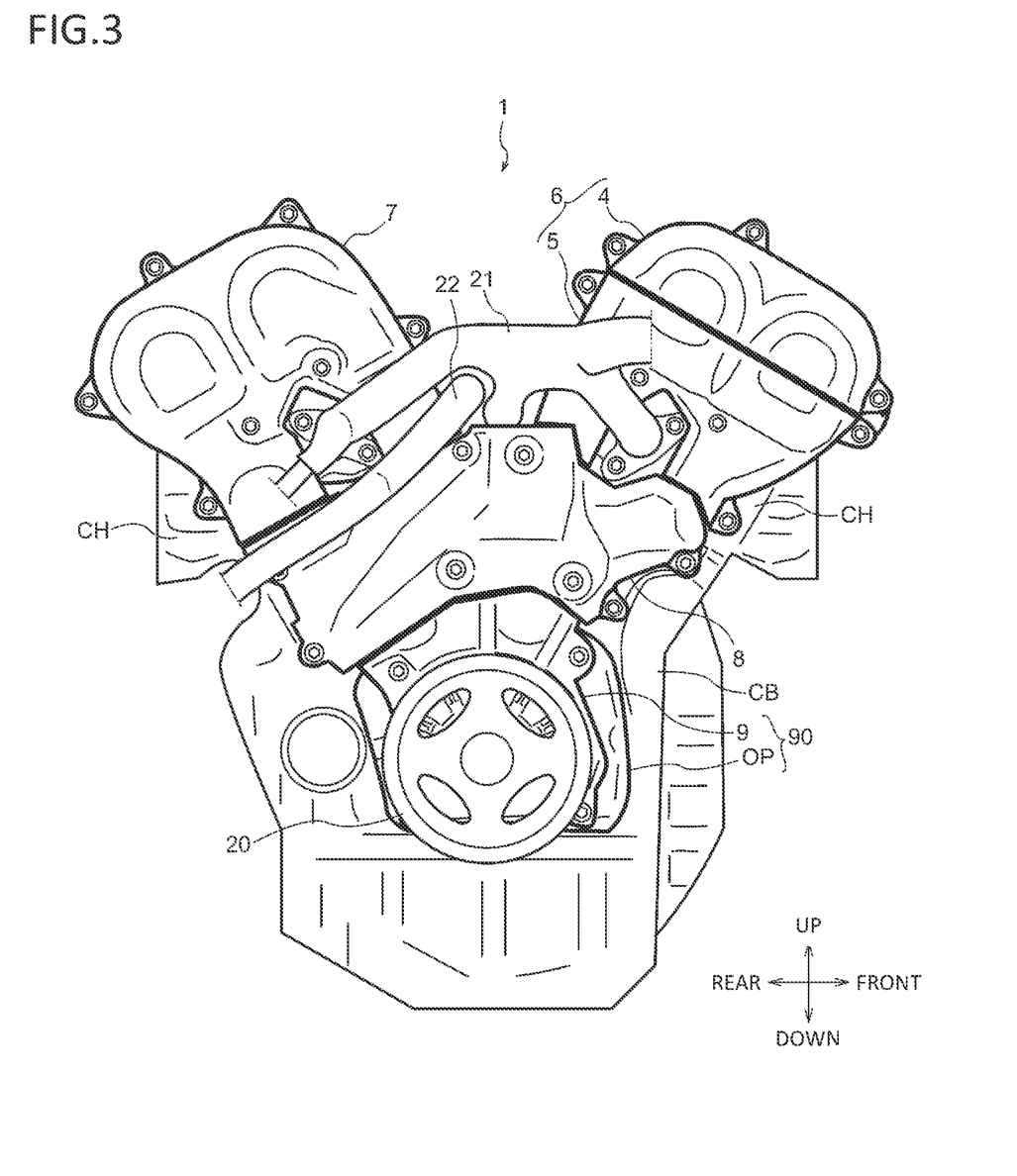
FIG. 3 is a side view, of the internal combustion engine, illustrating a state in which the belt cover is assembled.

FIG. 3 is a side view of the internal combustion engine 1 illustrating a state in which the belt cover is assembled. As illustrated in FIG. 3, in a state in which the belt cover is assembled, a crank pulley 20 is connected with the crankshaft 10, piping 21 is disposed outside the front outer cover 6 and the rear outer cover 7, and piping 22 is disposed outside the side mount bracket 8.

Next, in the belt cover structure of the internal combustion engine 1 in the present embodiment, the structure of a lower case 90 and its periphery will be described in detail. The lower case 90 includes: an oil pump case OP for covering the timing belt TB on a side closer to the internal combustion engine 1 than the timing belt TB; and the lower cover 9 for covering the timing belt TB on a side farther from the internal combustion engine 1 than the timing belt TB. The lower cover 9 is assembled with the oil pump case OP, by use of a fastening member such as a bolt. The lower case 90 accommodates the timing belt TB disposed on one side surface of the internal combustion engine 1. Specifically, the lower case 90 accommodates the drive pulley 15 attached to the crankshaft 10 and the timing belt TB around the drive pulley 15.

Hereinafter, in particular, a description will be given with regard to a drainage structure in which drained water from a water pump 30 is drained through the inside of the lower case 90 which is disposed to be adjacent to a lower side of the water pump 30, to a lower side of the lower case 90, and its peripheral structure. The water pump 30 is disposed to be adjacent to an inner side (a farther side in a crankshaft direction) than the side mount bracket 8. The water pump 30 includes a drain hole 35 for draining water above the lower case 90.

Figure 4:
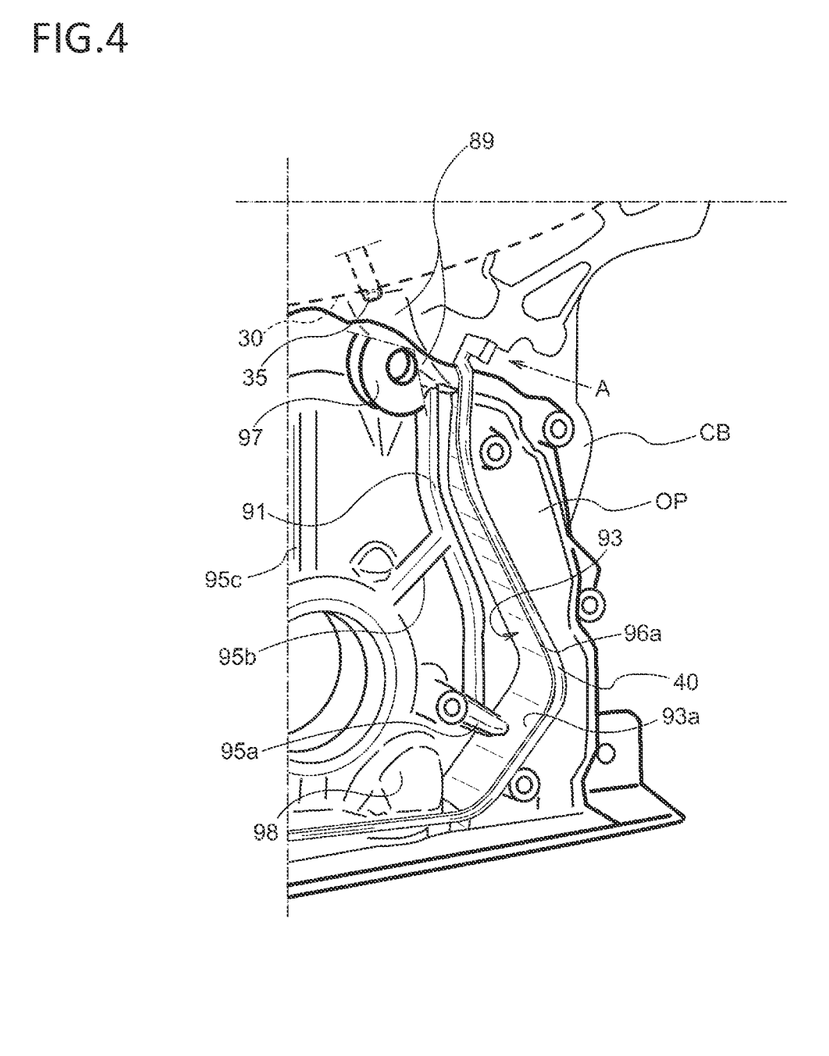
FIG. 4 is an enlarged perspective view of an oil pump case illustrating a configuration of an outer surface thereof.
Figure 5:
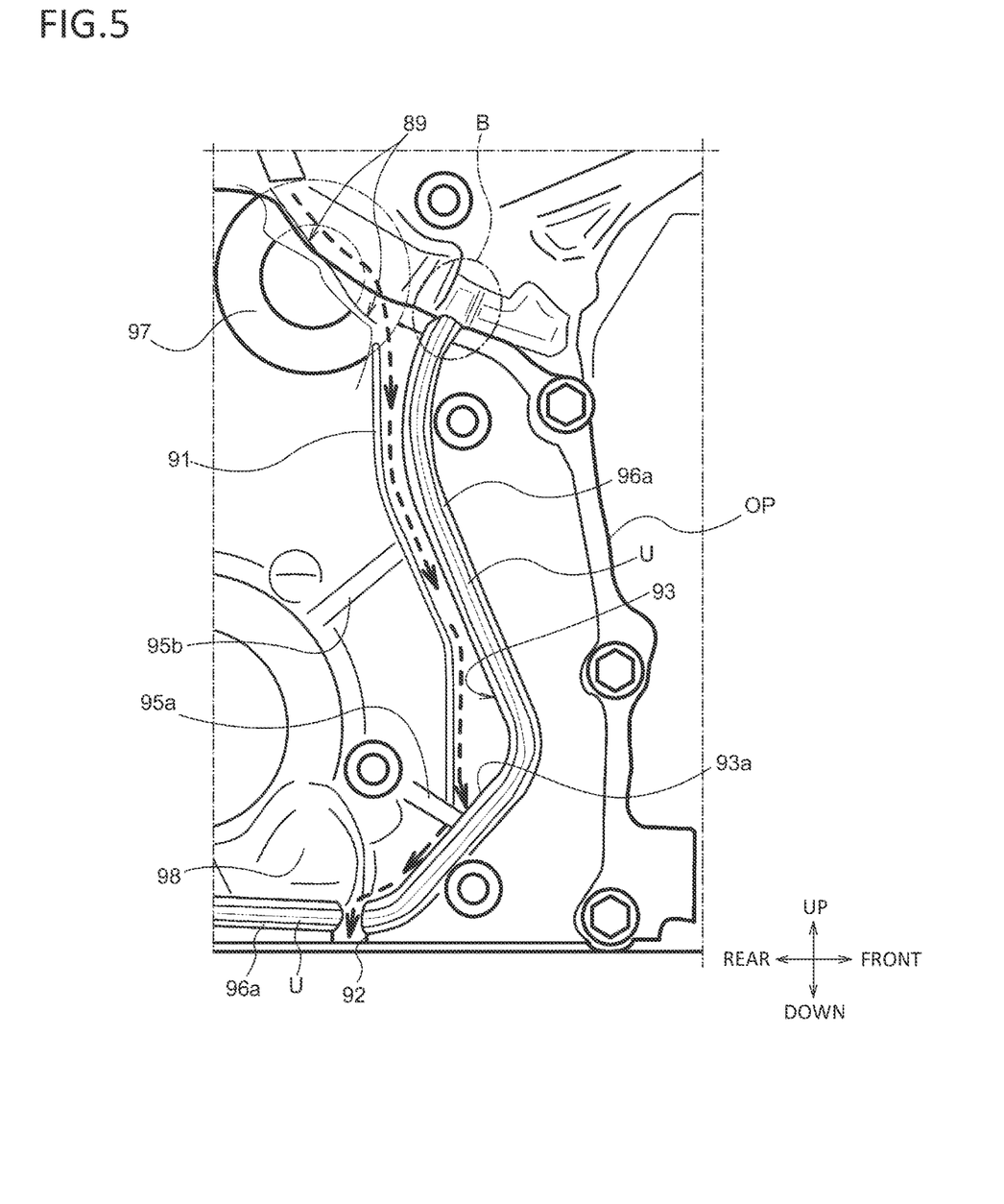
FIG. 5 is a side view of the oil pump case illustrating a flow of drained water.

A detailed configuration of the oil pump case OP will be described with reference to FIGS. 4 and 5. FIG. 4 is an enlarged perspective view of the oil pump case OP illustrating a configuration of an outer surface thereof. It is to be noted that FIG. 4 also illustrates the structure of a seal member 40 which is sandwiched between the lower cover 9 and the oil pump case OP. FIG. 5 is a side view of the oil pump case OP illustrating a flow of the drained water.

The oil pump case OP and the lower cover 9 are fixed by a fastening member such as a bolt through the seal member 40, and constitutes the lower case 90. The oil pump case OP is assembled to the cylinder block CB, and the lower cover 9 is assembled to the oil pump case OP.

On an outer surface of the oil pump case OP (a surface facing the lower cover 9), ribs for various purposes are provided. Specifically, the ribs include: a guide rib 91 which guides the drained water from the drain hole 35 to the lower side of the lower case 90 while separating the drained water from the timing belt TB; and ribs 95a, 95b, and 95c radially extending in a radial direction of the drive pulley 15 to suppress vibration of the oil pump case OP.

At a bottom end of the lower case 90, a discharge port 92 for discharging the drained water from the drain hole 35 from the lower case 90 is formed. The drained water from the drain hole 35 is guided to the discharge port 92 via the guide rib 91.

The oil pump case OP and the lower cover 9 respectively include mating surfaces 96a and 96b to mate with each other. A recessed groove U (see FIG. 5), into which the seal member 40 is fitted, is formed on the mating surface 96a of the oil pump case OP. Similarly, a recessed groove (not illustrated), into which the seal member 40 is fitted, is formed on the lower cover 9. A surface on the inside that is separated from the outside by the mating surface 96a of the oil pump case OP serves as an inner wall 93 of the lower case 90. The inner wall 93 is disposed to be spaced apart from the timing belt TB so as not to be in contact with the timing belt TB.

It is to be noted that in the present embodiment, a protrusion portion 98 for disposing an auxiliary machine is provided at a bottom end of the oil pump case OP. In this case, as in the present embodiment, the guide rib 91 is formed to be gradually spaced apart from the timing belt TB as it approaches the lower side. This is preferable, because the space for arranging the auxiliary machine is ensured and the water no longer drops onto the timing belt TB.

In addition, in the present embodiment, the drained water that has been guided to an inclined wall 93a side by the rib 95a flows from the rib surface toward the lower cover 9 side, and further flows toward the discharge port 92. However, the protrusion portion 98 prevents the water flow from flowing to the timing belt side, and the drained water is promptly discharged from the discharge port 92.

Instead of the protrusion portion 98, a rib may be provided to stop the drained water from flowing to the belt side, while suppressing vibration.

By disposing the protrusion portion 98 or the rib, foreign matters and water can be suppressed from entering the discharge port, and furthermore an effect of reducing vibration noise is obtainable.

In the present embodiment, the inclined wall 93a, which is inclined toward the discharge port 92, is formed in a lower part of the lower case 90 and in a lower part of the inner wall 93 on the oil pump case OP side. A bottom end 91a of the guide rib 91 is formed toward the inclined wall 93a. Therefore, the drained water from the drain hole 35 is guided to the discharge port 92 via the guide rib 91 and the inclined wall 93a.

In addition, the rib 95a is formed to be adjacent to the lower side of the bottom end of the guide rib 91. The rib 95a is formed to be inclined downward toward the inclined wall 93a. Therefore, after the drained water from the drain hole 35 is guided by the guide rib 91, the drained water is guided to the inclined wall 93a via the rib 95a with more certainty.

A fastening portion 97 for fastening a pulley 25 (see FIG. 1) is formed in the oil pump case OP. In FIGS. 4 and 5, the fastening portion 97 is partially omitted. On the cylinder block CB side relative to the fastening portion 97 in the axial direction, in between the drain hole 35 and the guide rib 91, an inclined surface 89, which is inclined from the drain hole 35 in a direction of the guide rib 91, is formed between the oil pump case OP and the cylinder block CB. Accordingly, the drained water from the drain hole 35 is guided to the inside of the lower case 90 along the inclined surface 89 formed between the oil pump case OP and the cylinder block CB. Here, the inclined surface 89 is preferably formed to be continuous with both the oil pump case OP and the cylinder block CB. However, the inclined surface 89 may be formed with either one of them.

In this manner, as illustrated in FIG. 5, the flow path of the drained water from the drain hole 35 includes the inclined surface 89, the guide rib 91, the rib 95a, and the inclined wall 93a. In addition, the inclined wall 93a is sealed by the seal member 40. With such a configuration, the drained water from the drain hole 35 is firstly guided to the inside of the lower case 90 by the inclined surface 89, and is guided to the discharge port 92 via the guide rib 91, the rib 95a, and the inclined wall 93a.

Figure 6:
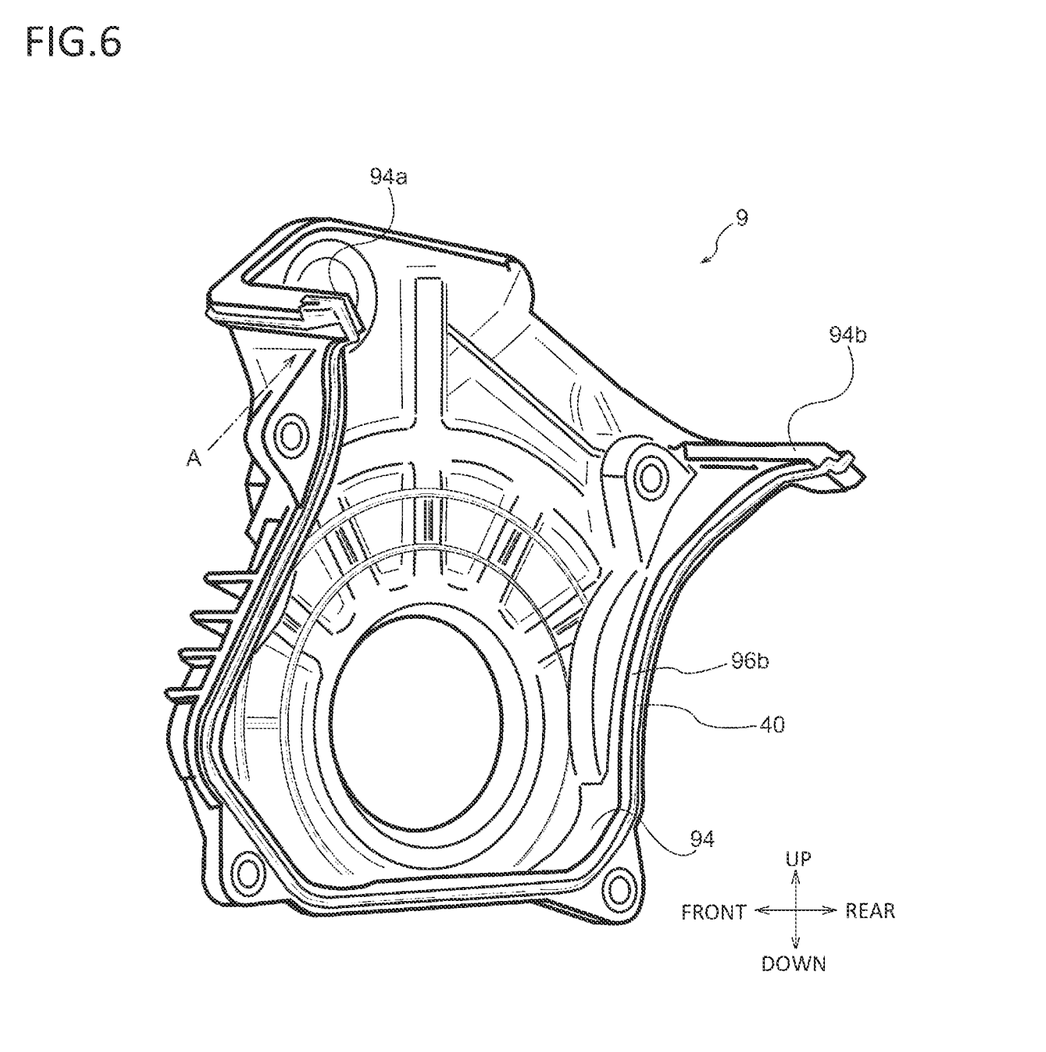
FIG. 6 is a perspective view of a lower cover, when viewed from the inside.
Figure 7:
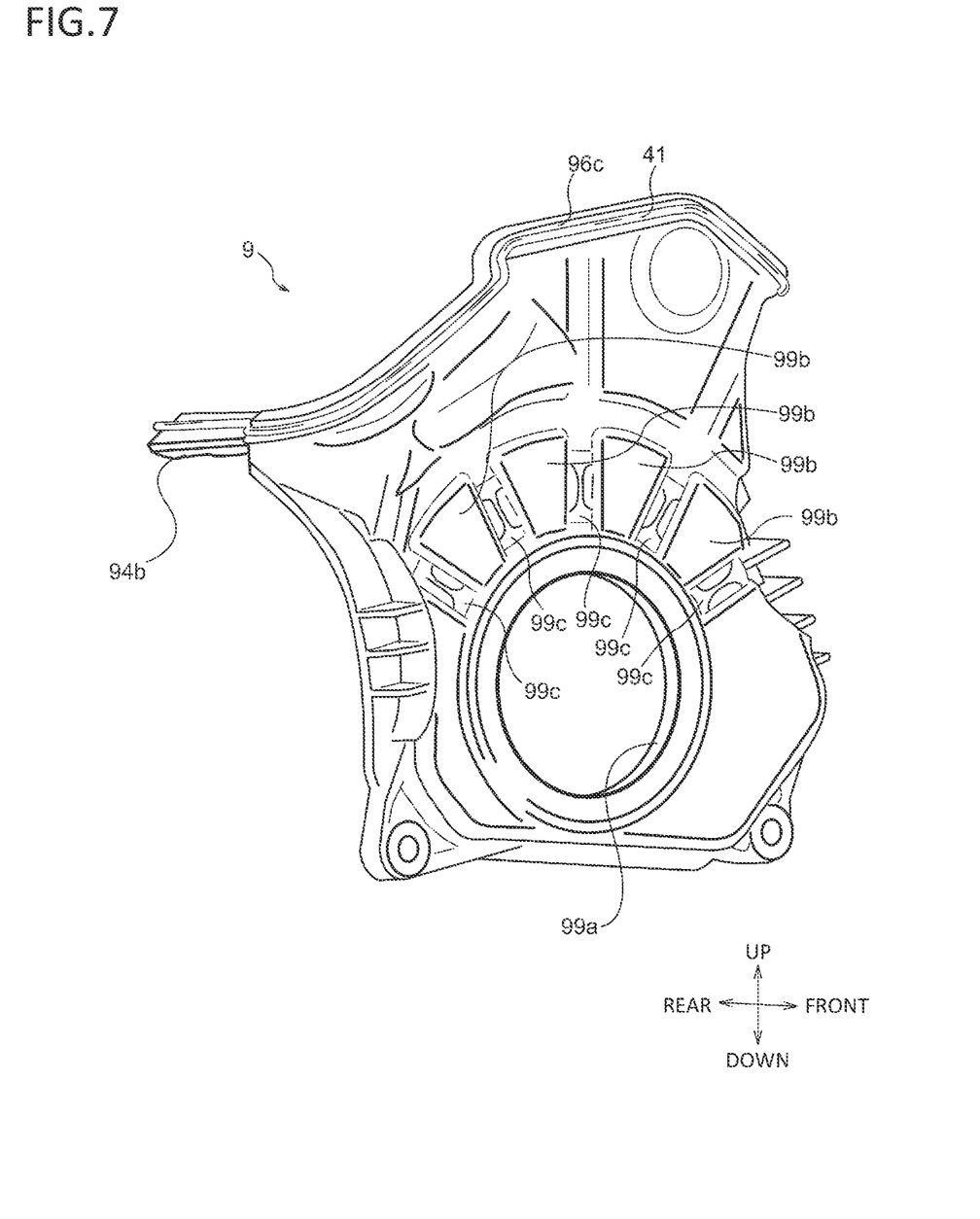
FIG. 7 is a perspective view of a lower cover, when viewed from the outside.
Figure 8:
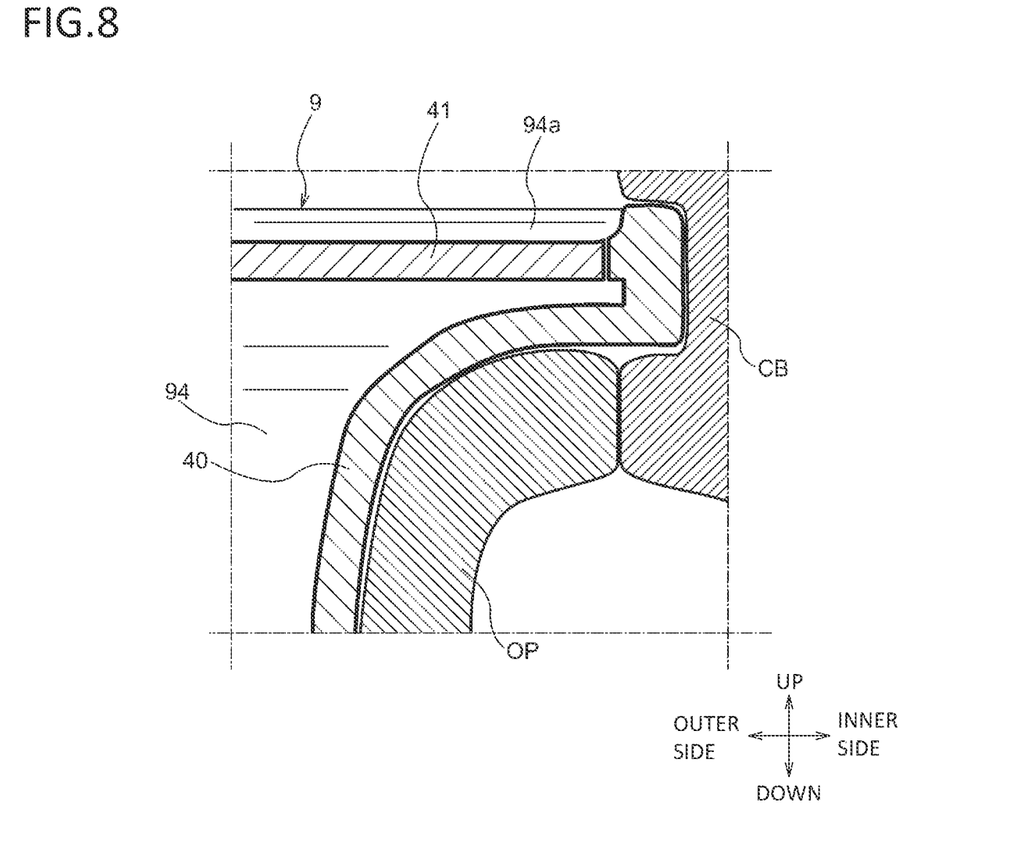
FIG. 8 is a view for describing a structure in which the oil pump case, the lower cover, and a cylinder block are sealed with one another.

A seal structure in the vicinity of the inclined surface 89, in a case where the lower cover 9 is assembled to the oil pump case OP, will be described with reference to FIGS. 6 to 8. FIG. 6 is a perspective view of the lower cover 9 when viewed from the inside. FIG. 7 is a perspective view of the lower cover 9 when viewed from the outside. FIG. 8 is a view for describing a structure in which the oil pump case OP, the lower cover 9, and the cylinder block CB are sealed with one another.

As illustrated in FIG. 6, on the lower cover 9, the mating surface 96b is disposed to mate with the mating surface 96a of the oil pump case OP, and thereby defining the inside and the outside of the lower case 90. The seal member 40 is fitted into a recessed groove formed on the mating surface 96b. A side wall 94 which separates the inside and the outside of the lower cover 9 is formed in the lower cover 9. The side wall 94 is formed to surround the periphery of the lower cover 9, excluding a part where the lower cover 9 is assembled to the side mount bracket 8.

The side wall 94 of the lower cover 9 is configured to extend in the crankshaft direction. Here, protrusion portions 94a and 94b are respectively formed in upper end portions of the side wall 94. The protrusion portion 94a and the protrusion portion 94b have different shapes, but have similar functions. Therefore, only the peripheral structure of the protrusion portion 94a will be described.

The protrusion portion 94a is a part of the side wall 94 further extending in the axial direction than the other parts of the side wall 94. Most parts of the mating surface 96b, which is formed at an end portion on the internal combustion engine body side in the axial direction of the side wall 94, abut the mating surface 96a of the oil pump case OP. On the other hand, the protrusion portion 94a reaches near the cylinder block CB beyond the oil pump case OP, and is fixed by being in pressure contact through the seal member 40. In this manner, the protrusion portion 94a is a part configured by making the side wall 94 protrude with a length that abuts the cylinder block CB in a direction of the cylinder block CB. In addition, the protrusion portion 94a covers a position facing on a front side of the inclined surface 89 (a portion B in FIG. 5).

As illustrated in FIG. 7, a mating surface 96c of the side mount bracket 8 is formed on an outer peripheral surface of an upper end of the lower cover 9 so as to surround the oil pump case OP. A lower seal member 41 for sealing the lower cover 9 and the side mount bracket 8 is disposed on the mating surface 96c. In addition, an upper end portion of the side wall of the lower cover 9 includes the protrusion portion 94b which protrudes in a direction of the internal combustion engine 1.

A plurality of vibration suppressing ribs are disposed on the outer surface of the lower cover 9 in order to increase the rigidity of the lower cover 9 and suppress vibration of the lower cover 9. On the outer surface of the lower cover 9, four first protruding ribs 99b in a plurality of fan shapes are radially formed with an opening 99a of the crankshaft 10 as the center. In addition, on the outer surface of the lower cover 9, five I-shaped second protruding ribs 99c are respectively disposed to be adjacent to the first protruding ribs 99b in a circumferential direction. The protruding height of the second protruding rib 99c is lower than the protruding height of the first protruding rib 99b. The second protruding ribs 99c, each of which is provided between the first protruding ribs 99b, increase the rigidity of the lower cover 9, suppress the surface vibration of the lower cover 9 caused by the crankshaft 10 and the timing belt TB being driven, and suppress the vibration of the mating surface 96c. Therefore, the sealing performance of the mating surface 96c can be maintained without being separately fastened with a fastening bolt or the like, and degradation caused by vibration of the lower seal member 41 can also be reduced. It is to be noted that the number of ribs is not limited to the number of ribs in the present embodiment. Further, also in FIG. 6 described above, vibration suppression ribs are formed to correspond to those in FIG. 7.

The protrusion portion 94a of the lower cover 9 abuts not only the oil pump case OP but also the cylinder block CB, and is fixed through the seal member 40. This seal structure will be described with reference to the drawings. FIG. 8 is a view for describing a structure in which the oil pump case OP, the lower cover 9, and the cylinder block CB are sealed with one another. FIG. 8 is a view, when viewed from a direction A in FIGS. 4 and 6.

As illustrated in FIG. 8, the protrusion portion 94a is a part of the side wall 94 which protrudes beyond the oil pump case OP with respect to the cylinder block CB. In the present embodiment, the protrusion portion 94a is formed at an upper end portion of the side wall 94. The cylinder block CB side of the protrusion portion 94a is fixed through the seal member 40. In addition, since the seal member 40 is continuously disposed at a bottom end of the protrusion portion 94a, the protrusion portion 94a is also fixed to the oil pump case OP through the seal member 40. In this manner, due to the presence of the protrusion portion 94a, the lower cover 9 is fixed to both the oil pump case OP and the cylinder block CB through the seal member 40.

As described heretofore, according to the present embodiment, the drained water from the drain hole 35 of the water pump 30 is guided by the guide rib 91 which is formed inside the lower case 90, to the discharge port 92. The drained water from the drain hole 35 of the water pump 30 is intentionally guided to the inside of the lower case 90, and the drained water is guided to the lower side of the lower case 90, and is then discharged. This eliminates the need for providing an opening for the drained water in the vicinity of the drain hole 35. In addition, the oil pump case OP and the lower cover 9 are fixed to each other through the seal member 40, and thus the sealing performance is good. This enables the provision of the belt cover for the internal combustion engine that efficiently discharges the water from the drain hole 35, that prevents water and dust from entering from near the drain hole 35, and that is good in the sealing performance for the waterproof and dustproof.

In addition, according to the present embodiment, the bottom end of the guide rib 91 is formed toward the inner wall 93 of the lower case 90, so that the drained water can be guided in a direction away from the timing belt TB. Further, the inclination of the inclined wall 93a enables the drained water to be efficiently guided to the discharge port 92.

In addition, according to the present embodiment, in the case where the oil pump case OP is assembled to the cylinder block CB to be adjacent to the lower side of the water pump 30, the drained water from the drain hole 35 of the water pump 30 is configured to be guided to the inside of the lower case 90 along the inclined surface 89 which is formed between the oil pump case OP and the cylinder block CB. This enables the drained water from the drain hole 35 of the water pump 30 to be smoothly guided to the inside of the lower case 90.

Further, according to the present embodiment, the protrusion portion 94a of the lower cover 9 is fixed to the cylinder block CB through the seal member 40 beyond the oil pump case OP. This enables the inclined surface 89, to which the protrusion portion 94a guides the drained water, to be separated from the outside of the lower case 90. This enables enhancement in waterproof and dustproof effects of the lower case 90.

In addition, according to the present embodiment, the rib 95a, which is formed to suppress the vibration of the oil pump case OP, extends in the radial direction of the drive pulley 15 attached to the crankshaft 10, and is formed below the bottom end of the guide rib 91. The drained water is guided to the guide rib 91, and is then guided to the inclined wall 93a via the rib 95a. This enables the drained water to be further guided in a direction away from the timing belt TB, and it becomes possible to suppress the drained water from dropping onto the timing belt TB.

Further, according to the present embodiment, the member to which the lower cover 9 is assembled is a part of the oil pump case OP. This enables the member to which the lower cover 9 is assembled also have a function of accommodating the oil pump, and it becomes possible to effectively use the member to which the lower cover 9 is assembled.

It is to be noted that the present invention is not limited to the described embodiments, and can be implemented in various modes. In the above-described embodiments, the timing belt TB is used as a transmission belt for drive transmission from the crankshaft 10 to the camshafts 11, 12, 13, and 14, without being limited to this. For example, as an example of the transmission structure of the internal combustion engine 1, a chain transmission mechanism may be configured by bridging a transmission belt including a timing chain across a crankshaft drive wheel and a camshaft driven wheel each including a sprocket.

In addition, in the above-described embodiments, the member to which the lower cover 9 is assembled is a part of the oil pump case OP, which accommodates the oil pump, without being limited to this. Alternatively, a case for accommodating an auxiliary machine other than the oil pump may be applicable, or a cover may be further disposed outside the oil pump case OP, and the lower cover 9 may be assembled to such a cover.

REFERENCE SIGNS LIST

1 Internal combustion engine
9 Lower cover (outer cover member)
30 Water pump
35 Drain hole
40 Seal member
89 Inclined surface
90 Lower case (case)
91 Guide rib
92 Discharge port
93a Inclined wall
94a Protrusion portion
95a Rib (vibration suppressing rib)
CB Cylinder block
CH Cylinder head
OP Oil pump case (inner cover member)
TB Timing belt

The invention claimed is:

1. A belt cover structure for an internal combustion engine, the belt cover structure being configured to accommodate at least a part of a timing belt disposed on one side surface of an internal combustion engine body, the belt cover structure comprising:
   a water pump disposed on the one side surface, and including a drain hole for draining water;
   an inner cover member that covers the timing belt on a side closer to the internal combustion engine than the timing belt; and
   an outer cover member that covers the timing belt on a side farther from the internal combustion engine than the timing belt, wherein
   the inner cover member and the outer cover member are fixed with each other through a seal member to constitute a case,
   a guide rib and a discharge port are formed inside the case, the guide rib being for guiding drained water from the drain hole to a lower side of the case, while separating the drained water from the drain hole from the timing belt, the discharge port being for discharging the drained water from the case at a bottom end of the case, and
   the drained water from the drain hole is guided by the guide rib toward the discharge port.

2. The belt cover structure for the internal combustion engine according to claim 1, wherein
   an inclined wall inclined toward the discharge port is formed in a lower part of the case,
   a bottom end of the guide rib is formed toward the inclined wall, and
   the drained water from the drain hole is guided via the guide rib and the inclined wall to the discharge port.

3. The belt cover structure for the internal combustion engine according to claim 1, wherein
   the inner cover member is assembled to the internal combustion engine body to be adjacent to a lower side of the water pump,
   an inclined surface is formed between the inner cover member and the internal combustion engine body, and
   the drained water from the drain hole is guided along the inclined surface to an inside of the case.

4. The belt cover structure for the internal combustion engine according to claim 3, wherein
   on the outer cover member, a protrusion portion protruding in a direction of the internal combustion engine body beyond the inner cover member is formed in a position facing the inclined surface, the protrusion portion being fixed to the internal combustion engine body through the seal member, and the inclined surface is separated from an outside of the case by the protrusion portion.

5. The belt cover structure for the internal combustion engine according to claim 1, wherein the case accommodates a drive pulley attached to a crankshaft, an inclined wall inclined toward the discharge port is formed in a lower part of the case, the guide rib is formed on the inner cover member, on the inner cover member, a vibration suppression rib extending in a radial direction of the drive pulley to suppress vibration of the inner cover member is formed on a lower side than the bottom end of the guide rib, and after the drained water from the drain hole is guided to the guide rib, the drained water is guided to the inclined wall via the vibration suppression rib.

6. The belt cover structure for the internal combustion engine according to claim 1, wherein the inner cover member is a part of an oil pump case that accommodates an oil pump.

\* \* \* \* \*